United States Patent [19]

Bishton, Jr. et al.

[11] 4,070,714
[45] Jan. 31, 1978

[54] SEWERLESS RECIRCULATING TOILET AND HUMAN WASTE STORAGE SYSTEM

[75] Inventors: Norris J. Bishton, Jr., Santa Monica; Robert L. Rod, Marina Del Rey; Bruce Wagenhals, Fountain Valley; Theodore M. Woltanski, Hawthorne; John S. Blick, III, Laguna Beach, all of Calif.

[73] Assignee: Monogram Industries, Inc., Santa Monica, Calif.

[21] Appl. No.: 446,294

[22] Filed: Feb. 27, 1974

[51] Int. Cl.² .................. E03D 5/016; B01D 37/00
[52] U.S. Cl. .................. 4/318; 4/DIG. 11; 210/65; 210/167
[58] Field of Search .......... 4/1, 8, 10, 11, 12, 4/18, 69, 76–80, 89, 114, 115, DIG. 3, DIG. 11, DIG. 5, 109; 210/152, 167, 259, DIG. 5, DIG. 21, 537, 65

[56] References Cited

U.S. PATENT DOCUMENTS

| | | | |
|---|---|---|---|
| 2,478,934 | 8/1949 | Morse | 210/537 X |
| 3,032,776 | 5/1962 | Obert et al. | 4/DIG. 11 |
| 3,199,676 | 8/1965 | May | 210/DIG. 5 |
| 3,431,563 | 3/1969 | Rascov | 4/1 |
| 3,628,196 | 12/1971 | Quiram | 4/115 |
| 3,633,218 | 1/1972 | Lekberg | 4/10 |
| 3,673,614 | 7/1972 | Claunch | 4/10 |
| 3,688,909 | 9/1972 | Titus et al. | 210/DIG. 21 |
| 3,829,909 | 8/1974 | Rod et al. | 4/10 |

*Primary Examiner*—Richard E. Aegerter
*Assistant Examiner*—Stuart S. Levy
*Attorney, Agent, or Firm*—Poms, Smith, Lande & Glenny

[57] ABSTRACT

A sewerless recirculating toilet and human waste storage system wherein human waste products and a flushing fluid of a specific gravity less than water are received from a commode, the waste products are separated from the flushing fluid, the separated waste products are stored indefinitely without additional treatment in a state of suspended animation for possible subsequent by-products recovery therefrom and the separated flushing fluid is stored on top of the separated waste products until a portion thereof is recycled back into the commode in a purified state for flushing the commode.

21 Claims, 7 Drawing Figures

Purification Curve

FIG. 6

SEWERLESS RECIRCULATING TOILET AND HUMAN WASTE STORAGE SYSTEM

BACKGROUND OF THE INVENTION

1. Field of the Invention

The invention relates to a sewerless recirculating toilet and human waste storage system; and, more particularly, to a system which provides indefinite storage of human waste in a state of suspended animation without additional treatment and with reusable flushing fluid stored on top thereof whereby the stored waste may be subsequently treated to recover by-products therefrom, if desired.

2. Description of the Prior Art

For nearly a century, one of the world's most inefficient inventions, the water flushing toilet, has been playing a major role in the ever-increasing pollution of the earth's dwindling supply of pure fresh water. Each and every user, whether served by public sewers or septic tanks, uses an average of 13,000 gallons of drinking quality water each year merely to flush toilets — pure water that carries off individual annular production of a mere 165 gallons of body waste. In the case of sanitary sewers, this 165 gallons of annual body waste is carried to complex and costly centralized sewage treatment plants. There, depending on the level and type of treatment system, only 40 to 90 percent of the harmful matter that is introduced into otherwise perfectly drinkable water is removed.

The remainder of the contaminants — including pathogenic viruses not normally eliminated by conventional sewage treatment — can find their way back into the environment. The result is further degradation of invaluable pure water supplies.

The problem is made even more difficult by some 19,000 gallons of lightly polluted bathing and wash water ("grey" water) that is used yearly. "Grey" water is intermingled with the more heavily contaminated toilet flushing water ("black" water). Thus, the average adult consumes about 32,000 gallons of water annually — all of it polluted with 165 gallons of body waste.

For the tens of millions served by septic tanks, the results are no different. Heavily contaminated black waters containing harmful pathogenic bacteria mix with grey water. This mixture then seeps into the ground and creates innumerable potential health crises — to say nothing of costly and often impossibly difficult operational and maintenance problems in many areas of the country.

One response to such situations is recirculating sanitary systems which are well known in the art and have been described and shown in various prior art patents and pending applications. The most significant prior art is set forth in copending applications for patents entitled "Recirculating Toilet" by Donald A. Dotson, et al., Ser. No. 395,936, filed Sept. 10, 1973 now abandoned, which is a continuation of Ser. No. 212,423, filed Dec. 27, 1971, now abandoned, "Recirculating Toilet", by Robert L. Rod et al, Ser. No. 338,200, filed Mar. 5, 1973, now abandoned and "Oil Recovery System" by Norris J. Bishton, Jr., Ser. No. 212,594, filed Dec. 27, 1971, now abandoned, a continuation thereof having been filed as application Ser. No. 449,534 on Mar. 8, 1974, now U.S. Pat. No. 3,934,175 all assigned to assignee of this application, and in patents issued to Obert, et al., U.S. Pat. No. 3,032,776; Rascov, U.S. Pat. No. 3,431,563; and Claunch, U.S. Pat. No. 3,673,614. Recirculating toilets of the various commercially available types have, for the most part, utilized water as the reusable flushing fluid.

It has been deemed a problem of the prior art, when considering the disposal of waste products, that even the limited amounts of water required in a recirculating toilet system consumed substantial amounts of energy in its disposition. Most prior art techniques have required that the water component accompanying human wastes must either be extensively treated to bring it to a quality suitable for release into the environment or that it be incinerated together with the other waste products, thereby returning it to the environment in the form of water vapor.

In the above-identified applications of Rod et al., Dotson, et al., and Bishton, Jr., it was proposed that a recirculating toilet system utilize an oil as the flushing fluid to further limit the water component of the waste materials; however, additional treatment such as addition of chemicals to the waste materials was utilized. The use of an oil had been suggested in the prior art patents to Obert, et al, and Rascov, supra. Obert, et al., had taught the reuse of oil as a flushing liquid after the waste had been ground and transported to a settling tank. Because of the difference in specific gravity, the flushing liquid separated out as an upper layer and was siphoned off through a line for return to the flush tank or the reservoir. In other embodiments, a fuel oil was used and was burned with the waste products as a part of the normal combustion system producing power and heat. Similarly, Rascov taught an incinerating apparatus for immediate disposition of the waste.

Most recently, the patent to Claunch, supra, taught a more or less conventional toilet bowl and tank, which was connected to recirculate a nonaqueous flush medium. A pressurized fluid reservoir stored fluid not otherwise held in the toilet tank and stored it away from the waste material. A special waste compartment was provided which enabled the separation of the flush medium from the waste.

In Claunch, the waste products were admitted at the base of a separating tank and the waste products in the sewage went into immediate separation. The solid waste products were automatically periodically removed to a grinder, then passed to a receiving tank where the waste broke down and was held until delivered to a final disposal area, such as an incinerator. The flush fluid was permitted to rise in the tank through a screen filter above the waste to a storage area from whence fluid was withdrawn through a coalescer filter.

The flushing fluid, meanwhile, was passed to an accumulator which acted in conjunction with a pump to supply flushing fluid on demand to the commode.

The waste products were withdrawn from the separating tank using level and weight sensors which initiated the operation of a macerator-grinder. Other sensors terminated the transfer operation when the level of the flush medium fell below a predetermined desired level.

The Claunch system included a number of floats and sensors, all of which were required to operate in the hostile environment of the waste products. Further, the operation of the system depended upon the proper and orderly operation of the plurality of sensors, switches, and electrically operable valves, and a plurality of protective redundant switches and alarm circuits were necessary for the operation of the system.

Such a system may be referred to as a "total waste disposal system". However, it has always been known that human waste has a considerable value from the ecological standpoint. The total waste disposal system of Claunch is not adapted to the long storage of waste products without such waste products breaking down and causing problems such as odors and generating dangerous methane gas as well as losing economic value. One of the difficulties involved in recycling such waste, however, is the breakdown or degradation thereof over a period of time. Other problems involve the disadvantages generally involved in storing such waste for indefinite periods of time, such as odors, storage capacity, re-use of flushing fluid, etc..

It has been deemed desirable to have a simplified sewerless recirculating system that is more reliable and more easily maintained and does not use drinking water to transport body wastes. It has further been felt desirable to give the user a toilet that is identical in appearance and operation to a water flush toilet in order to gain user acceptance since most users have rejected non-water flush toilets such as incinerator toilets. It has also been felt desirable that some improved toilet fixture should be provided since the flushing fluid is not generally a solvent for the human waste products that must be accommodated by the system. Such a system should also be adapted for use with multiple toilets and a single fluid supply as part of a housing complex or in a large vehicle, such as a ship or large aircraft, and should maintain human waste in a state of suspended animation indefinitely so that such waste could be withdrawn when convenient and subsequently treated for its economic value, if desired.

SUMMARY OF THE INVENTION

It is an object of this invention to provide a sewerless recirculating and human waste storage toilet system which is adapted to store human waste products for an indefinite period of time in a state of suspended animation.

It is a further object of this invention to store both the human waste products and the reusable flushing fluid in a single tank thereby eliminating the necessity for separate storage of the fluid, subsequent disposal of the human waste products, etc..

It is still another object of this invention to provide a human waste disposal and storage system which is separate from a grey water disposal system so that no drinking water is required in the disposal of human waste.

These and other objects are preferably accomplished by providing a sewerless recirculating toilet and human waste storage system which receives both waste products and a flushing fluid from a commode, separates the waste products from the flushing fluid, stores the separated waste products indefinitely without additional treatment in a state of suspended animation and stores the separated flushing fluid on top of the separated waste products until a portion thereof is recycled back into the commode in a purified state for flushing the commode.

In this manner, the waste products may be removed from the tank at any convenient time and either disposed of or treated for its economic value since the waste products are in a concentrated form and are not broken down. The flushing fluid is purified prior to recycling back into the commode.

DESCRIPTION OF THE PREFERRED EMBODIMENT

Figures 1, 2, 3:
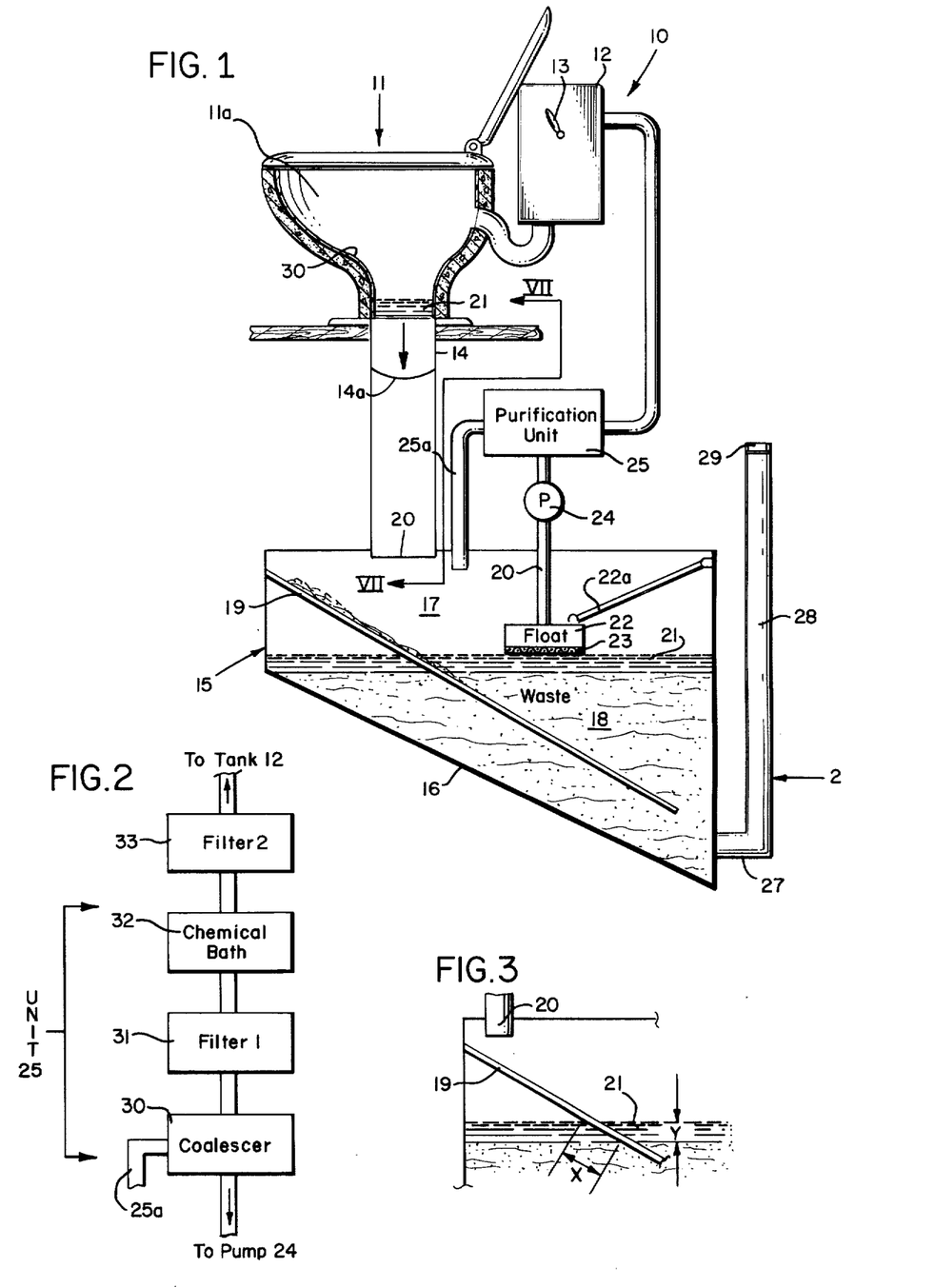
FIG. 1 is a vertical sectional, partly schematic, view of a recirculating toilet and human waste storage system in accordance with the teachings of the invention.
FIG. 2 is a diagrammatic view of the purification unit of the system of FIG. 1.
FIG. 3 is a detailed view of a portion of the system of FIG. 1.

A sewerless human body waste storage and recirculating toilet system 10 is shown in FIG. 1 having a commode 11 which may have a toilet bowl 11a and may also include a closet tank 12 for storing a supply of flush medium or flushing fluid to be used in the bowl 11a. However, it is not necessary that system 10 include such a tank 12 and, as will be discussed hereinbelow, an exemplary feature of this system 10 is that tank 12 may be eliminated. Thus, the word "commode" used hereinafter refers either to a toilet bowl and toilet tank combination or a toilet bowl per se.

However, tank 12 may include a conventional filling mechanism, such as a float operated valve or float control switch (not shown) for controlling the flow of flushing fluid to bowl 11a and thus through system 10 as is well known in the art. Such a switch automatically shuts off the pump of system 10 when tank 12 is full. This switch may be operated by a suitable means, such as a manually operable handle 13. Of course, if tank 12 is eliminated, handle 13 may be disposed directly on bowl 11a and operatively connected to system 10 for initiating a flushing cycle as is well known in the art. Alternatively, a pressure switch (not shown) may be used to shut off the pump when a float valve is used in tank 12 to shut off the incoming line. A human waste line 14 may have a sanitary trap 14a (see also FIG. 7) therein in fluid communication at one end with the interior of bowl 11a. Trap 14a may be eliminated if bowl 11a is a so-called "dry" bowl. It is to be understood that the upper portion of trap 14a is above the water level in bowl 11a as is well known in the art.

As particularly contemplated within the present invention, means may be provided for both receiving a mixture of human waste products and flushing fluid from commode 11, separating the waste products from the flushing fluid, store the separated waste products indefinitely in a non-biodegradable manner, and store the separated flushing fluid until a portion thereof is recycled in a purified state back into the commode 11 for flushing the commode 11.

In the exemplary embodiment, such means, indicated generally at 15, includes a sealed tank 16 having an upper flushing fluid storage space 17 and a lower waste products storage space 18. Tank 16 may have an inverted generally tapered shape along one side thereof and is thus greater in cross-section at the top than at the bottom.

Floating flushing fluid intake means may be provided including an intake pipe 20 supported on the surface of the flushing fluid 21 in tank 16 by means of a suitable float 22 which may be of foam or other light but bulky material with high flotation qualities. A flexible coupling 22a may be provided between float 22 and the edge of tank 16. The intake pipe 20 may be connected to a screen 23 located upon the bottommost portion of float 22 to thereby insure that only the surface portion of the flushing fluid 21 will be drawn into the intake of pipe 20. Obviously, intake pipe 20 is vertically movable to permit float 22 to move vertically within tank 16. For example, pipe 20 may be flexible or a flexible coupling may be provided between the upper end of pipe 20 and its connection to either pump 24 or purification unit 25. Float 22 may include a plurality of intake orifices.

A conventional pump 24 may be provided in fluid communication with intake pipe 20 for pumping flushing fluid 21 from tank 16. The output of pump 24 is in fluid communication with a purification unit 25 which is in turn in fluid communication with water closet tank 12. The components of unit 25 will be discussed further hereinbelow. However, a drain line 25a may be provided for returning waste back to tank 16.

Means 15 further includes a waste discharge outlet 26 which includes a first portion 27 in fluid communication with the lowermost portion of tank 16 and a second portion 28 extending generally vertically upward from first portion 27 and generally parallel to tank 16. A pump-out fitting 29 may be provided at the upper open end of portion 28.

Bowl 11a preferably has its interior coated with a suitable hydrophobic material for preventing the adhering of human waste products thereto, as for example, a Teflon coating 30.

It can be seen in FIG. 1 that the outward appearance of bowl 11a is similar to that of any conventional water flush toilet. However, the flushing fluid 21 in bowl 11a is preferably a non-aqueous fluid that looks like water and is lighter than water, such as a suitable mineral oil or the like. Such flushing fluids are well known in the toilet art and have an oil base that serves the dual purpose of completely cleaning the interior of the bowl 11a of all waste material and also maintains the flushing mechanism of the system in a completely lubricated state at all times. The flushing fluid preferably is one that is non-toxic so that it will not harm anyone or anything it comes into contact with and does not support bacterial life so as to insure the hygenic condition of the bowl 11a and the flushing fluid.

The operation of system 10 will now be described. In prior art systems, the quantity of flushing fluid required to carry out the functions of the system is stored in a separate tank or reservoir. However, as will be discussed shortly, most of the flushing fluid in the system of this invention is stored directly in tank 16 itself. However, as in conventional "wet" bowl systems, an additional quantity of flushing fluid 21 stands in the bowl 11a as shown supported by trap 14a in sewage line 14 which creates an odor seal between bowl 11a and tank 16. Of course, if bowl 11a is a "dry" bowl, no fluid is retained therein. Also, as will be discussed hereinbelow with respect to FIGS. 2 and 3, a quantity of flushing fluid will remain in purification unit 25.

After bowl 11a has been used, operation of the flush mechanism via handle 13 permits tank 12 to empty into the bowl 11a. The added weight of the contents of tank 12 causes the fluid 21 to pass through trap 14a, thereby flushing the waste products through the discharge end 20 of line 14 into tank 16.

Before describing the further operation of system 10, the process taking place in tank 16 will now be described. The waste products deposited into tank 16 settle by gravity in the lower portion which forms the human waste products storage space 18. The flushing fluid 21, which is of a specific gravity and density less than water, rises to the top of the mixture of fluid and waste products and settles on the upper surface thereof in the upper portion or the flushing fluid storage space 17 of tank 16. It can be seen that maximum gravitational assisted separation of the waste products from the flushing fluid 21 takes place in tank 16 before the fluid 21 is used again in another flushing cycle as will be discussed shortly. Further, as will also be discussed, both the fluid 21 and the human waste products are stored in the same tank (i.e., tank 16) where the separation takes place. Thus, the fluid 21 is stored in tank 16 on top of the separated waste products until needed again in another flush cycle.

As particularly contemplated within the present invention, the means 15 enables the system of this invention to perform the functions of separating the human waste products from the flushing fluid, storing the human waste products indefinitely and storing the flushing fluid until needed for recycling. The importance of holding the human waste products indefinitely in a state of suspended animation by effectively arresting virtually all aerobic and anaerobic bacterial action is that the waste products do not break down and thus retain valuable properties. The holding of the waste products in a state of suspended animation is a result of the separation of the flushing fluid from the human waste products and storage of the flushing fluid in sealing contact with the human waste products. Human waste products and flushing fluid enter the tank 16 from the top downwards. The human waste products settle to the bottom and the fluid rises to the top. The continuing presence of the fluid on top of the human waste products in sealing contact therewith holds the human waste in suspended animation. This may be attributed to the fluid cutting off almost all oxygen from the human waste products, thereby stopping aerobic bacterial action. (Some oxygen permeates through the fluid during human waste products entry permitting a small amount of aerobic bacterial action at the interface of the fluid and the human waste.)

The first human waste entering tank 16 has a pH of from approximately 6.7 to 7.5. Anaerobic bacterial action (which does not require oxygen) begins. The intermediate breakdown products of this initial anaerobic bacterial action cause the pH of the mass of human waste to rapidly go towards the acidic and thereafter during the "methane forming" phase to reverse and permanently rise to over approximately 8.0. Anaerobic bacteria cannot thrive at such pH levels. As a result, anaerobic bacterial action virtually ceases. Thereafter, the normal daily additions of fresh human waste products are not sufficient to lower the pH so that anaerobic bacterial action can resume. Thus, as will be discussed shortly, when tank 16 is pumped out, a small amount of human waste is preferably allowed to remain in the bottom of tank 16.

Possibly some of the chemicals in the human waste, notably urea and its hydrolystate ammonia, act as a bacteriostat and assist the high pH in stopping anaerobic bacterial action.

The relationship between the fluid and human waste in the tank 16 is that because the fluid is there, sealing the surface of the human waste, the waste is in suspended animation. Then, because the waste is in suspended animation and not thereby putting bacterial metabolite contaminants in the fluid, the fluid can remain in the tank 16.

Thus, returning once again to the description of the operation of system 10, the human waste products are retained or stored indefinitely in tank 16 with the flushing fluid 21 settling as a layer above the human waste products and in sealing contact therewith.

When pump 24 is activated, as by suitable connection to switch or handle 13 as is well known in the art (or float 22 may be carried above a sensed preset level), flushing fluid 21 is withdrawn from tank 16. This fluid may include some fine particles of paper or other matter that have neither settled out nor have been excluded by screen filter 23.

Thus, referring now to FIG. 2, it is necessary to purify the returning flushing fluid from tank 16 to commode 11 to insure its non-contaminated condition when it reaches commode 11 so that the flushing fluid does not take on undesired colors and/or odors. Accordingly, flushing fluid purifying means in the form of a purification unit 25 is used which includes a combination of both chemical and physical elements. Its function is to remove any contaminants which remain in the flushing fluid after it leaves tank 16. This may be accomplished by a coalescer 30 connected to the output of pump 24 which first removes suspended solids and water particles from the flushing fluid. Any solids and water particles removed by coalescer 30 may be flowed back into tank 16 via drain line 25a communicating with the interior of coalescer 30 as shown in FIG. 2.

The fluid is then passed through a first adsorbent filter 31, such as Fuller's earth, which removes any water, dissolved or suspended, not removed by the coalescer 30. The fluid is then passed through a chemical bath 32, such as chlorine, which oxidizes certain odorous and pathogenic contaminants present in the treated fluid. Finally, the chemically treated fluid is passed into a second adsorbent filter 33, such as activated charcoal, for removing dissolved contaminants other than water-borne contaminants.

The useful life of the filter media in filter 33 is greatly shortened by water particles so it is necessary that filter 31 and chemical bath 32 remove such particles to insure the longest possible useful life for filter 33. The flushing fluid preferably arrives at filter 33 containing the least possible amount of contaminants possible. This is because the filter 33 must be able to remove the contaminants in the minimum amount of time the fluid remains in filter 33 and its size and useful life is determined by how much contaminants it has to remove. Ideally, filter 33 is designed to last the capacity of tank 16 so that it need be replaced no sooner than when tank 16 is pumped out.

For the foregoing reasons, it is desirable to minimize the amount of contaminants in the flushing fluid before it reaches filter 33. Thus, as particularly contemplated within the present invention, means are provided for minimizing as far as possible any disturbance as the flushing fluid and human waste products enter tank 16. In the exemplary embodiment, such means includes an inclined ramp 19 leading from the discharge end 20 of human waste line 14 to the bottom of tank 16. The use of ramp 19 increases the area at the point of entry and increases the effective thickness of the flushing fluid by reason of the angle of entry. The thickness of the flushing fluid reduces disturbance to the human waste below the fluid. Ramp 19 also reduces the velocity of the entering fluid and human waste mixture before it comes into contact with the fluid 21 and human waste already in tank 16. Ramp 19 is preferably coated with a hydrophobic material such as Teflon. Further, it has been found that toilet paper or the like may collect about the ramp 19 and also act as a buffer for incoming human wastes. Shown in FIG. 3, ramp 19 is inclined at an angle of approximately 20 to 30 degrees to the horizontal plane of the fluid 21. The distance X of the entering mixture, by reason of the angle of entry, is appreciably greater than the thickness Y of the fluid 21. For example, Y may be approximately 2 inches in thickness.

In addition to minimizing the disturbance of the contents of tank 16, it has been found that it is necessary that the mixture entering tank 16 have sufficient time after entry for small suspended particles of aqueous waste in the mixture to settle down through fluid 21 by gravity before flushing fluid 21 is withdrawn. Such time in the example set forth below has been found to be approximately eight minutes. Thus, the point of entry of the mixture of human waste and fluid into tank 16 is as far removed as possible from the pick-off point of flushing fluid (i.e., intake pipe 20). Thus, the distance between pipe 20 and the end of ramp 19 is as wide as possible depending on the thickness of the fluid, the length and width of tank 16, etc..

Minimizing the amount of contaminants in the flushing fluid before it reaches filter 33 may also be affected by maximizing the volume of flushing fluid present in system 10 consistent with the overall capacity of tank 16. First, it should be noted that the total amount of flushing fluid present in system 10 is important toward balancing system 10. When system 10 is in a static condition before or after a flush cycle, flushing fluid is located in the commode itself, in tank 16, in the unit 25 and in the lines between tank 16, unit 25 and commode 11. (It is to be understood that reference to commode 11 includes any fluid in tank 12 if such tank is to be used in system 10). The amount of fluid in commode 11 and in the lines between tank 16, unit 25, and commode 11 is relatively constant whereas the amount in unit 25 and tank 16 may vary.

Ideally, when commode 11 is flushed and the flushing fluid therein moves to tank 16 and remains there, some of the flushing fluid which was in tank 16 prior to the flush of the commode 11 moves to unit 25 and remains there, and some or all of the fluid that was in unit 25 moves into the commode 11. This is illustrated graphically in FIG. 4 wherein the direction of the arrows shows how the fluid moves from commode 11 to tank 16, then from tank 16 to unit 25 and from there back to commode 11.

Figure 5:
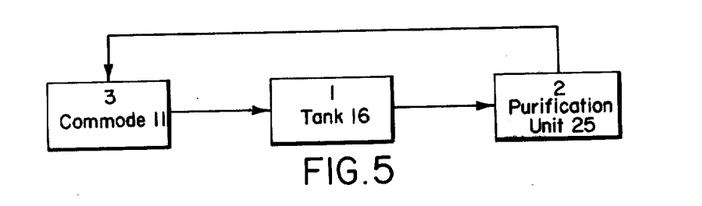
FIG. 5 is a diagrammatic view of the system of FIG. 1 showing another operation thereof.

After flush, the deposit of a mixture of human waste products and flushing fluid in tank 16 results in a refill of the flushing fluid therein. This is shown diagrammatically in FIG. 5. There is no short circuiting of fluid. That is, no fluid passes from tank 16 to commode 11 on a given flush without receiving treatment in unit 25. The fluid first moves from tank 16 to unit 25, then to commode 11. Thus, the size of the final filter 33 in unit 25 in relation to the capacity of commode 11 and tank 16 is crucial. For example, if commode 11 holds only five gallons and filter 33 holds only two gallons, obviously on a flush some fluid must pass from tank 16 through filter 33 to commode 11 without any contact time other than the very limited time it takes to pass through filter 33. Filter 33 must therefore be sized at least as large as the total capacity of both commode 11 and tank 16. The fluid in tank 16 ideally remains there no less than for a predetermined period of time, as for example, eight minutes. The fluid in the unit 25 should remain for the amount of contact time required by the filtering media in unit 25. It can be seen that the total amount of fluid present in system 10 is critical toward a balanced system.

EXAMPLE

Figure 4:
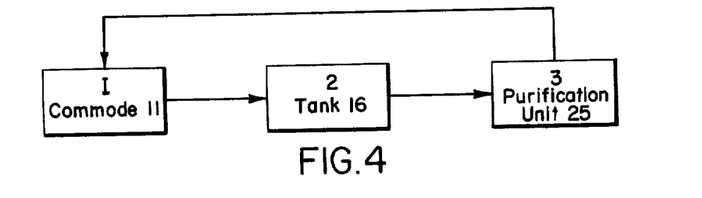
FIG. 4 is a diagrammatic view of the system of FIG. 1 showing one operation thereof.

If each of the elements in FIG. 4, i.e., commode 11, tank 16 and unit 25, held five gallons of flushing fluid, system 10 would simply move five gallons from element to element with every flush. However, it has been determined that typically a commode will be flushed approximately every 2½ minutes under continuous use with potential users thereof standing in line. Refill time has been found to be normally about two minutes. Thus, in order to ensure that the flushing fluid in tank 16 has at least approximately eight minutes settling time before reuse, the volume of flushing fluid in tank 16 must be greater than that in commode 11. For example, assume that system 10 is designed for a high traffic public sanitation situation. A 5 gallon commode capacity (e.g., bowl 11 and its tank 12) would dictate at least twenty gallons of flushing fluid in tank 16. This is determined by the following equation:

8 minutes settling time ÷ 2 minutes refill time × 5 gallon toilet capacity = 20 gallons in tank 16.

As discussed above, the flushing fluid 21 is drawn off of the top of the layer of fluid 21 in tank 16. Thus, minimizing the contaminants in the fluid 21 being pumped through unit 25 is further accomplished by drawing off the fluid as close to the top as possible, e.g., the upper one-third of layer 21. The amount of contaminants in the layer of fluid 21 (i.e., in a given thickness of fluid) varies from top to bottom with more contaminants near the bottom. In addition, it is important not to disturb the human waste below the layer of fluid 21 in the vicinity of float 22.

The screen 23 associated with float 22 also serves to minimize the contaminants by substantially preventing water from passing through. For example, screen 23 may be coated with a hydrophobic material such as Teflon to minimize water particles in the removed fluid.

The selection of pump 24 itself can be used to minimize contamination. For example, certain pumps have a tendency to break up any water particles into smaller particles which makes the function of the coalescer 30 in unit 25 more difficult. Thus, preferably a pump which does not break up water particles such as reciprocating piston pump should be used.

The removal of as much water from the fluid as possible before the fluid reaches filter 33 is the function of coalescer 30 and filter 31. Water limits the life of filter 33 which removes non-water borne contaminants from the fluid.

Figures 6, 7:
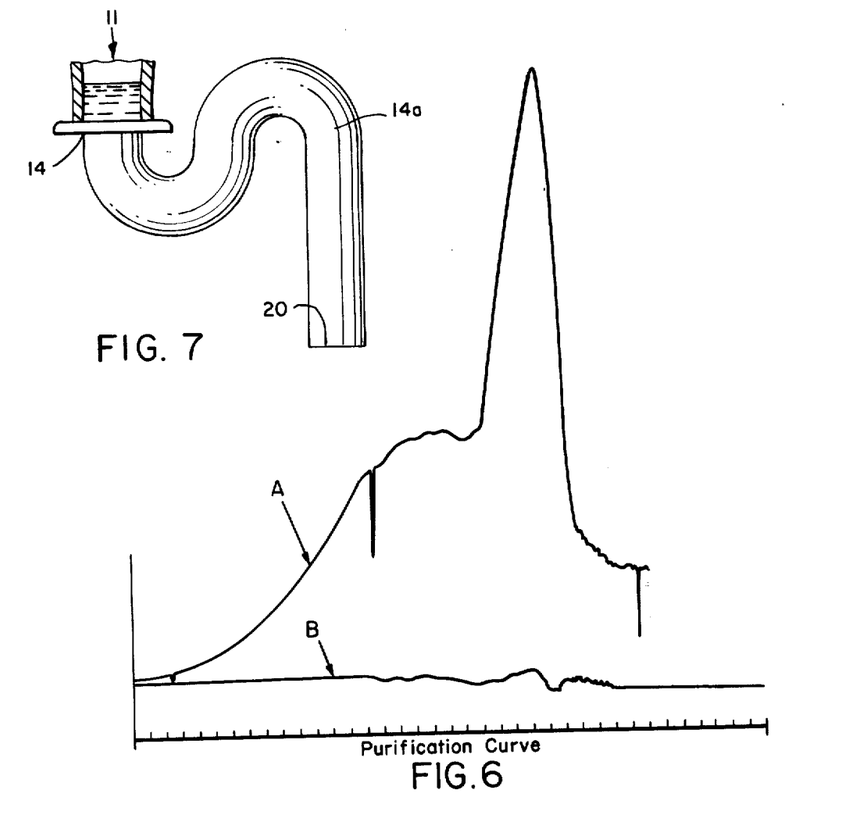
FIG. 6 is a purification curve illustrating the operation of the system of FIG. 1.
FIG. 7 is a detailed view of a portion of the system of FIG. 1 taken along lines VII — VII thereof.

Referring now to FIG. 6, a highly contaminated sample of a flushing fluid removed from system 10 prior to pumping the fluid through purification unit 25 was examined to identify contaminants giving the fluid odor and color. Primary cause of odor and color was found to be vegeatable oils and carotene in human feces. Water soluble contaminants were present in colloidal form (i.e., droplets). It was found that the purification unit 25 employed in system 10 completely removes all of these contaminants and delivers a clear, water-white odorless fluid free of all suspended and dissolved pollutants. This is shown analytically in the Purification Curve of FIG. 6 which is a plot from a spectrophotometer which compares the contaminated fluid (upper curve A) after flushing but prior to purification and reuse with the purified fluid (lower curve B) after purification. The "X" or horizontal axis indicates the "ultra-violet wavelength" and the "Y" or vertical axis indicates the "percentage absorption".

A test was run to examine the bacterial counts in the toilet wastes under a floating layer of flushing fluid in a system in accordance with the invention. After a period of about a week from a fresh start, there is normal growth of aerobic and coliform bacteria. However, there is virtually no anaerobic activity due to the high pH of these wastes. This buildup of pH is shown in the following table, wherein each entry is a progressive entry from the first to the last thereof. That is, entry No. 1 is the first day of testing, entry No. 2 is a subsequent day of testing, and so on until the final or seventh day of testing.

TABLE

| PROGRESSIVE TESTING DATES | pH | APPEARANCE OF FLUSHING FLUID |
| --- | --- | --- |
| 1. | 7.5 | clear |
| 2. | 4.8 | clear |
| 3. | 5.0 | clear |
| 4. | 5.6 | clear |
| 5. | 5.8 | clear |
| 6. | 6.2 | clear |
| 7. | 8.8 | clear |

It can be seen, therefore, that, starting from day one, the wastes go through a typical rapid "acid-forming" phase reducing the pH. Thereafter, the wastes enter the "methane forming" stage which raises the pH to the alkaline side. Due to the high ammonia content in the wastes derived from breakdown of urine, the pH reaches 8.8 whereupon anaerobic activity all but ceases. This high pH holds the wastes quiescent thereafter. In normal system operation, some waste may always be left in the waste separation/holding tank 16 to act as a "seed" to assure continued operation at this desirable pH.

It can be seen from the foregoing that a balanced system has been described taking into consideration the total amount of flushing fluid present in system 10 and the size of filter 33. In practice, human waste discharge outlet 26 may be used to remove stored waste from tank 16 as will be further discussed shortly. Although all of the human waste may be removed at any convenient time, it has been found that, once system 10 has been started, it is desirable to pump down the human waste in tank 16 leaving some of the human waste in the bottom of tank 16 to "seed" subsequent human waste deposits rather than removing all of the human waste, e.g., a layer of sufficient volume that the normal usage of the system does not substantially disturb its state of suspended animation. Initially, tank 16 may be "seeded" with two to three inches of human waste in the example set forth above prior to first use of system 10.

Although tank 16 may take any suitable configuration and may be thus sized to anticipate the amount of human waste between cleaning periods, a tank having a sloping or sump portion is preferred. Also, the human waste should be pumped out of tank 16 in a manner causing as little disturbance to the contents as possible. For example, in the tank 16 illustrated in FIG. 1, a vacuum truck (not shown) having a hose which is adapted to attach to the pumpout fitting 29 may be used. The vacuum hose line is opened and the level of flushing fluid in tank 16 is observed in any suitable manner, such as visually or by means of suitable level sensors or the like. When the flushing fluid in tank 16 reaches a predetermined level, the vacuum pump is stopped thereby leaving all of the flushing fluid and a small amount of human waste in tank 16.

It can be seen from the foregoing that a system has been described wherein human waste may be stored indefinitely in a state of virtual suspended animation, e.g., for 2 years. The system is totally balanced so that it functions in a manner storing flushing fluid and human waste in the same tank, yet recycles the fluid back into the toilet of the system in a non-contaminated condition without the necessity of added chemcials, deodorizers, etc.. Human waste as it leaves the body has valuable properties but is designed to quickly self-destruct through aerobic and anaerobic bacterial action. By stopping such self-destruction in the system described, it is possible to store the human waste indefinitely yet collect it when desired and convenient. The human waste is in a concentrated form and can produce everything from methane gas to various extracted chemical compounds producible only within the human body.

The techniques disclosed hereinabove result in the elimination of the necessity of using drinking water for the disposal of human body wastes. At least 40% of the pure water now used for domestic purposes would be saved. The result is no more flushing away of constantly diminishing reserves of drinkable water. Since no disposal of human waste is required in our system, highly contaminated toilet wastes no longer can pollute lakes, rivers and oceans. No more harmful bacteria breeding need take place where pure lakes and rivers used to be.

Finally, the need for complex and expensive sewage treatment plants is greatly reduced. Increasing population has heretofore made proper treatment of sewage impossible.

The "sewerless" toilet system disclosed hereinabove utilizes a clear, odorless, non-reactive fluid to flush the toilet of the system. This fluid looks exactly like water; but unlike water, it is used over and over again continuously in each system to carry waste to a small, sealed tank which may be kept underground. These wastes may be collected once yearly or the like, by modern automated tanker trucks.

Thus, sewage waste disposal problems may be eliminated in many areas where conventional sewer lines and centralized treatment plants are inadequate, impractical, or economically unfeasible. This means that areas may now be developed where septic tanks are either prohibited outright or operate poorly. Sanitation can thus be provided wherever it is needed without regard to the existence of sewers.

The system described hereinabove may be combined with a grey water system for the separate treatment of lightly polluted bathing and wash water. Thus, the toilets used in homes or the like may be separated from remaining home fixtures, such as sinks, showers, washing machines, etc.

The toilet disclosed hereinabove is virtually indistinguishable from a conventional water flush toilet. Flushing and refill is significantly quieter than with a standard water flush toilet. Human waste instantaneously sinks to the bottom of the bowl beneath the fluid, making it difficult to see and sealing off obnoxious odors so common in ordinary toilets. Thus, a toilet as disclosed herein is far more pleasant to use than a standard water flush toilet.

No discernible bacteria of any type is found in the fluid used herein, or on the sides of the bowl, making the toilet of this system much more hygenic than a water flush system.

Housecleaning chores normally associated with water flush toilets have been substantially eliminated. There is no mineral or fecal matter buildup on the bowl. The combination of the coating on the bowl and the flushing fluid prevent conventional water flush toilet problems from occurring.

The tank 16 receives black waste by gravitational flow from the toilet or toilets in the system. For residential use, this tank may be sized to contain approximately 50% of the annual waste product of the occupants — the other 50% usually being deposited away from home at places of employment, schools, etc.. For a family of four, for example, a 350-gallon tank will allow for a once-a-year service cycle.

The elements used in the purification unit 25 may be designed to have a design life equal to the capacity of the separating and storage tank 16. Because of the novel techniques of this invention disclosed hereinabove, the waste remains quiescent in the separating and storage tank 16. No consequential bacterial action takes place. This waste represents 53% of the pollution-causing contaminants and 98% of the harmful bacteria, viruses and other potential disease-causing microorganisms which, had water flush toilets been used, would only be partially removed from otherwise pure water by conventional sewage treatment.

The toilet and black waste system disclosed hereinabove is fail-safe, because it is a closed loop system. When the separating and human waste storage tank 16 is full and for some reason has not been pumped out, the system simply stops functioning until it is seviced. Waste is removed from the tank by a vacuum pump truck and never enters the ground or water supply.

The black waste removed from the system of this invention is approximately 95% liquid and 5% solids — similar to sewer sludge. Most importantly, no chemicals whatsoever have been added to it, thereby making it far easier to process at the remote point of ultimate disposal.

Various off-site disposal alternatives, including processing the human waste for recovery of valuable by-products may be considered. For example, the black waste may receive a dewatering and supernatant treatment, a pyrolysis treatment for ultimate disposal thereof, or a by-products recovery treatment. The latter may include the use of the recovered by-products as animal feed, fertilizer, exotic chemicals, methane fuel, hormones, amino acids, or the like.

Although this system has been described with respect to a so-called "wet" bowl having fluid therein, the techniques of this invention are also applicable to a "dry" bowl without fluid therein. Further, obviously more than one commode may be connected to a single tank 16 as is well known in the toilet arts.

These and other modifications may occur to one skilled in the art and the invention is limited only to that described in the appended claims.

What we claim is:

1. In a method for recirculating a non-aqueous flushing fluid into a commode having a predetermined quantity of said flushing fluid associated therewith wherein said commode is in fluid communication with a human waste products and flushing fluid outlet, the improvement which comprises the steps of:
   placing a tank in fluid communication with said outlet for receiving said mixture of human waste products and flushing fluid therein;
   retaining said mixture in said tank until said flushing fluid separates from said human waste products and floats as a layer on the top in sealing contact with said human waste products;
   storing said layer of flushing fluid in said tank until said flushing fluid is recycled back into said commode by maintaining said layer of flushing fluid in sealing contact across the upper surface of said human waste products in said tank until said flushing fluid cuts off substantially all oxygen from said human waste products thereby stopping aerobic bacterial action in said human waste products; and
   continuing to maintain said layer of flushing fluid in sealing contact with said human waste products until the pH of said human waste products reaches a level at which anaerobic bacterial action in said human waste products virtually ceases.

2. In the method of claim 1 wherein the step of storing said human waste products includes the step of depositing a mixture of flushing fluid and human waste products having a pH of from approximately 6.7 to 7.5 into said tank, the step of continuing to maintain said layer in sealing contact with said human waste products in said tank includes the step of maintaining said fluid in sealing contact with said waste products until the pH thereof rises over approximately 8.0.

3. In the method of claim 1 further including the step of removing at least a portion of the layer of flushing fluid stored in said tank from the upper portion of said layer and recirculating said removed flushing fluid back into said commode.

4. In the method of claim 3 including the step of purifying said removed flushing fluid by removing suspended solids and water particles therefrom and oxidizing remaining contaminants in said removed flushing fluid prior to pumping said removed flushing fluid into said commode.

5. In the method of claim 4 wherein the step of purifying said removed flushing fluid includes the steps of:
   first, removing suspended solids and water particles from the removed flushing fluid;
   subsequently removing any dissolved or suspended water from said flushing fluid;
   subsequently oxidizing contaminants in said flushing fluid; and
   finally removing any undissolved non-water-borne contaminants from said flushing fluid.

6. In the method of claim 5 including the step of minimizing the disturbance of the layer of flushing fluid floating on the stored separated human waste products in said tank caused by the entry of a mixture of flushing fluid and human waste products into said tank by introducing said mixture therein at an acute angle to the horizontal plane of said layer of flushing fluid.

7. In the method of claim 6 wherein the step of introducing said mixture includes the step of introducing said mixture into said tank as far as possible in said tank from the point of removal in said tank of said flushing fluid from the layer of flushing fluid stored therein.

8. In the method of claim 7 including the step of selectively removing sufficient stored human waste products only from said tank until a volume of said stored human waste products remains in said tank sufficient to insure said state of suspended animation during subsequent usage.

9. In a sewerless recirculating toilet and human waste products storage system, having a commode with a flushing fluid of a specific gravity less than water associated therewith, a trap controlled waste products and flushing fluid outlet leading from said commode to a waste products and flushing fluid separation space, a storage space for the separated human waste products, the improvement which comprises:
   fluid and human waste storage means operatively connected to said outlet for receiving said mixture of human waste products and said flushing fluid, separating said flushing fluid from said human waste products, storing said human waste products for an indefinite period of time in a state of suspended animation by maintaining said layer of flushing fluid in sealing contact with said human waste products until said flushing fluid cuts off substantially all oxygen from said human waste products thereby stopping aerobic bacterial action in said human waste products, and continuing to maintain said layer of flushing fluid in sealing contact with said human waste products until the pH of said human waste products reaches a level at which anaerobic bacterial action in said human waste products virtually ceases, so that said flushing fluid is stored on top of said human waste products and a portion of said stored flushing fluid may be recycled back into said commode, when desired.

10. In the system of claim 9 wherein said fluid and human waste storage means includes a sealed tank in fluid communication with said outlet, said tank being greater in cross-section at the top than at the bottom thereof, the outlet opening into the upper portion of said tank.

11. In the system of claim 10 further including a waste products discharge outlet operatively connected to said tank, said discharge outlet including a first portion in fluid communication with the lower portion of said tank and a second portion in fluid communication with said first portion extending generally vertically upward from said first portion and generally vertically upward from said first portion and generally parallel to said tank, and a pump-out fitting closing off the terminal end of said second portion.

12. In the system of claim 10 further including floating flushing fluid intake means supported on the surface of the flushing fluid disposed in said tank for withdrawing at least a portion of the flushing fluid from said tank and recycling said withdrawn flushing fluid back into said commode.

13. In the system of claim 12 wherein said flushing fluid intake means includes a float floating on the surface of the flushing fluid in said tank to a depth of about one-third of the thickness of said flushing fluid, a hydrophobic screen associated with said float in engagement with said flushing fluid, an intake pipe in fluid communication with both said float and said commode, and pumping means operatively engaging said pipe for pumping flushing fluid from said tank, through said screen and said float to said intake pipe and into said commode.

14. In the system of claim 13 including flushing fluid purifying means disposed between said pumping means and said commode and in fluid communication with said intake pipe for purifying said flushing fluid prior to entry into said commode.

15. In the system of claim 14 wherein said flushing fluid purifying means includes coalescing means in fluid communication with said pulsing means for removing suspended solids and water particles from said flushing fluid, said coalescing means including a solids and water particles return line in fluid communication with said tank, first adsorbent filtering means in fluid communication with said coalescing means for removing both dissolved and suspended water from said flushing fluid, oxidizing means in fluid communication with said first adsorbent filtering means for oxidizing contaminants in said flushing fluid, and second adsorbent filtering means in fluid communication with said oxidizing means for removing non-water-borne dissolved contaminants from said flushing fluid.

16. In the system of claim 15 wherein said first adsorbent filtering means includes Fuller's earth as a filtering medium, said oxidizing means includes chlorine as an oxidizing medium, and said second adsorbent filtering means includes activated charcoal as a filtering medium.

17. In the system of claim 15 wherein the flushing fluid capacity of said second adsorbent filtering means is at least as great as the total flushing fluid capacity of both said commode and said tank, the flushing fluid capacity of said tank being greater than that of said commode.

18. In the system of claim 17 wherein the flushing fluid capacity of said tank is about four times greater than that of said commode.

19. In the system of claim 12 including disturbance minimzing means associated with both said outlet and said tank for minimizing disturbance of said mixture of human waste products and flushing fluid in said tank when a subsequent mixture thereof enters said tank, said disturbance minimizing means including an inclined ramp leading from said outlet to the interior of said tank.

20. In the system of claim 19 wherein said ramp is coated with hydrophobic material and at an angle of between approximately 20 and 30 degrees with respect to the horizontal plane of said separated flushing fluid.

21. In the system of claim 19 wherein the point of entry of said ramp into said tank is spaced from said intake means.

* * * * *